Oct. 26, 1954 C. M. O'LEARY 2,692,516
CHANGE-SPEED TRANSMISSION
Original Filed April 29, 1949 5 Sheets-Sheet 1

CHARLES M. O'LEARY,
INVENTOR.
BY
ATTORNEY

Patented Oct. 26, 1954

2,692,516

UNITED STATES PATENT OFFICE 2,692,516

CHANGE-SPEED TRANSMISSION

Charles M. O'Leary, Los Angeles, Calif.

Continuation of application Serial No. 90,473, April 29, 1949. This application November 28, 1951, Serial No. 258,729

9 Claims. (Cl. 74—740)

This application is a continuation of my application Serial No. 90,473, filed April 29, 1949, for Change-Speed Transmission, now abandoned, and in part covers subject matter disclosed in applicant's Patent No. 2,555,454.

The present invention relates to change-speed transmissions. Although shown in a preferred embodiment especially suitable for use in the operation of well drilling apparatus of the rotary type to afford drives of different ratios for the rotary table and hoisting drum of such drilling apparatus, the principles of the invention are readily applicable to transmissions arranged to drive many and various other types of apparatus.

An important object of the invention is to provide an improved multi-speed mechanical transmission of the positive ratio type which is especially useful when employed in conjunction with hydromatic torque converters of the Foettinger type. As pointed out in my Patent No. 2,555,454, the range of torque ratios through which such a Foettinger hydraulic transmission will operate at high efficiency is relatively narrow. Although it gives an infinite adjustability within such narrow range, which is of course a highly desirable characteristic, the efficiency drops off so rapidly upon either side of such range that where a wider range is desired, it becomes a practical necessity to employ a supplemental transmission, ordinarily of mechanical character. In my aforementioned copending application, I have disclosed an improved planetary gear transmission for extending the range of operation of such a hydraulic torque converter in a manner particularly adapted for driving the rotary table of a drilling machine, and which takes into account the operating characteristics of such torque converters with respect to efficiency range as noted. The transmission disclosed in such application employs only a single planetary gearset and affords two mechanical driving ratios, one of which is a direct drive. The present invention aims to improve upon the transmission disclosed in my aforementioned copending application by affording an increased number of ratios and by providing means adapted to drive a plurality of driven elements, as for example the hoisting drum as well as the rotary table, or two or more slush pumps, which may be operated through differential driving means in such manner as to decrease the danger of overstressing the parts when high loads are encountered with two driven pumps being operated in compound relation, for example.

Still another object is to provide such a transmission which affords four forward speed ratios and two reverse speed ratios, yet which employs only a single planetary gearset.

It is also an object of the present invention to provide a mechanical change-speed transmission of the indicated character which affords a plurality of speed ratios so related to one another as to take advantage of the efficiency characteristics of a Foettinger type hydraulic torque converter employed therewith.

Another object is to provide such a transmission which is relatively light in weight and compact in construction in proportion to its torque handling capacity, which has relatively few operating parts, most of the operating parts of which are enclosed and protected, which is easy to service and maintain, and which readily adapts itself to automatic control mechanisms to permit changes of ratio to be effected automatically without requiring the attention of an operator, and in accordance with the most efficient operating characteristics of a related hydraulic torque converter, as previously noted.

Other objects and advantages will become apparent upon consideration of the present disclosure in its entirety.

Figure 1:
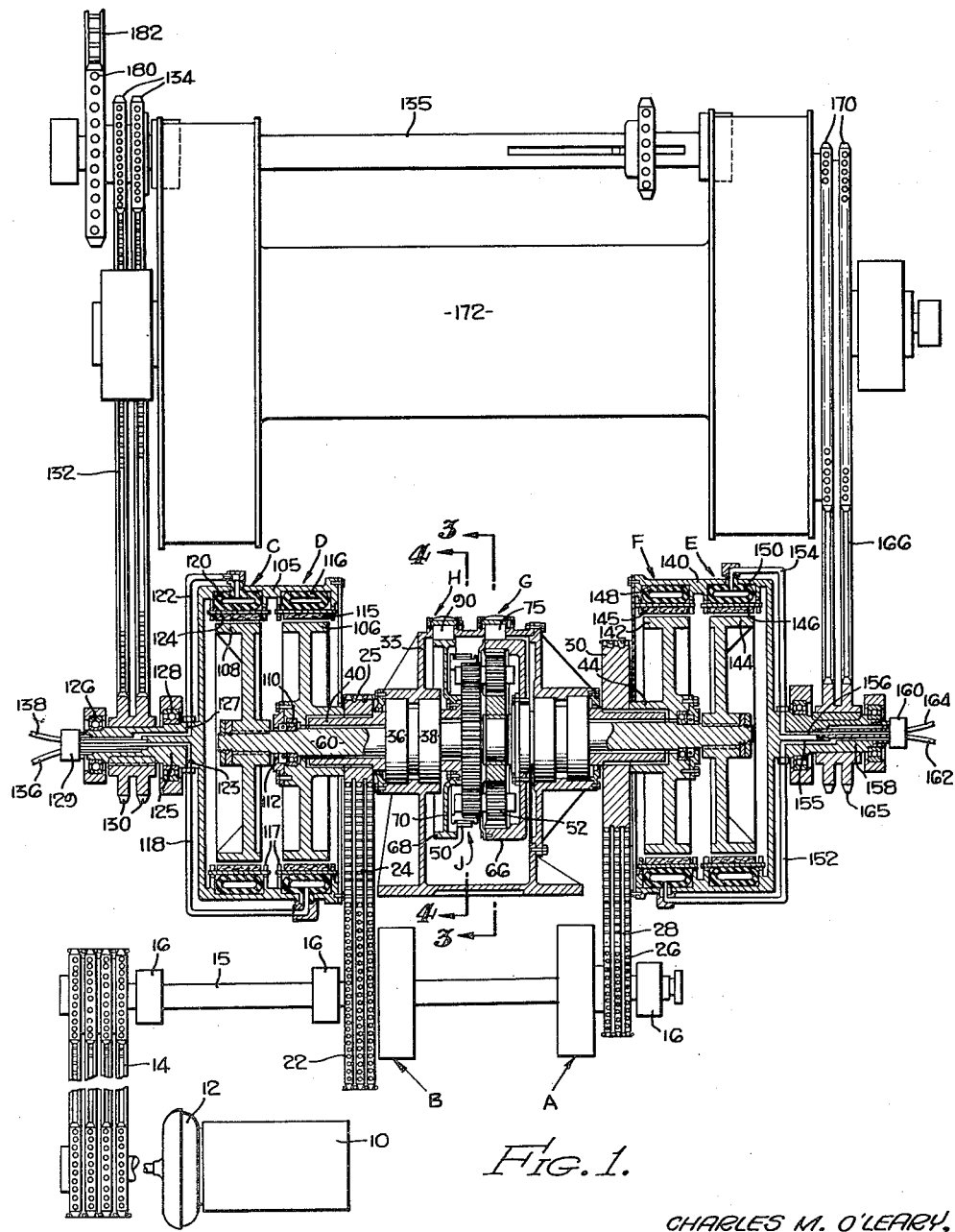
Figure 1 is a somewhat diagrammatic, horizontal sectional plan view of a transmission constructed in accordance with the present invention showing the transmission in substantially diametric section and illustrating associated driving and driven elements.
Figure 3:
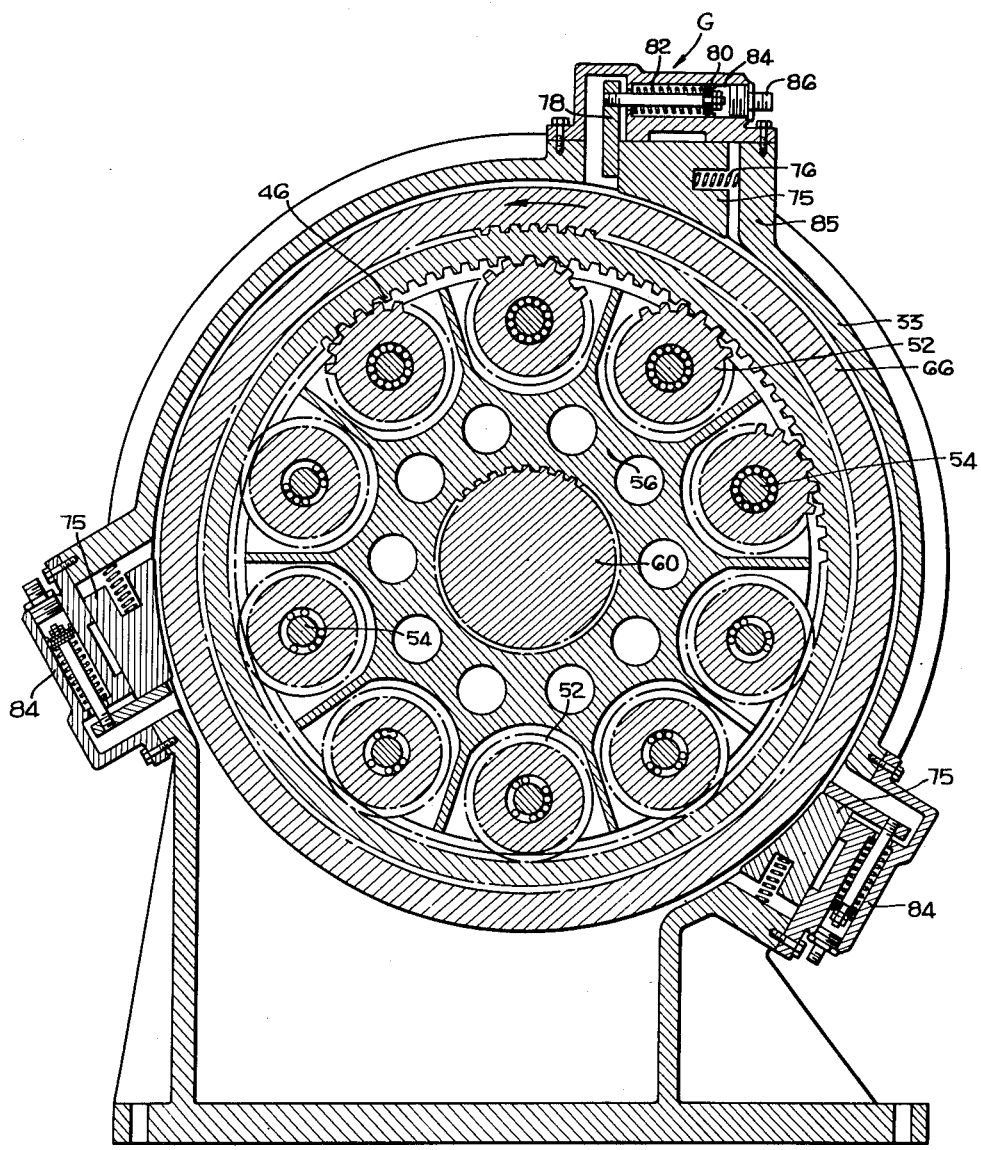
Figure 4:
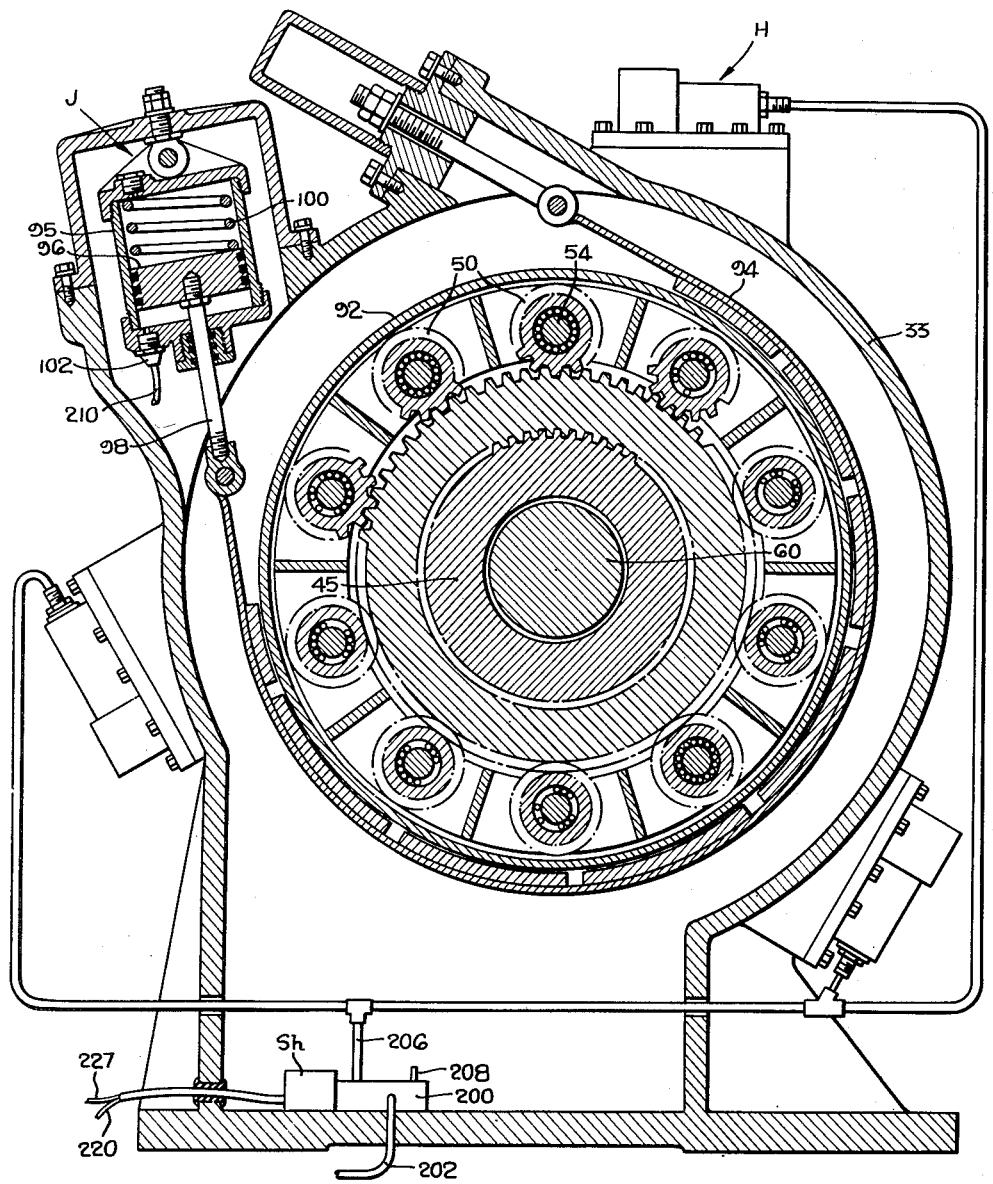
Figure 5:
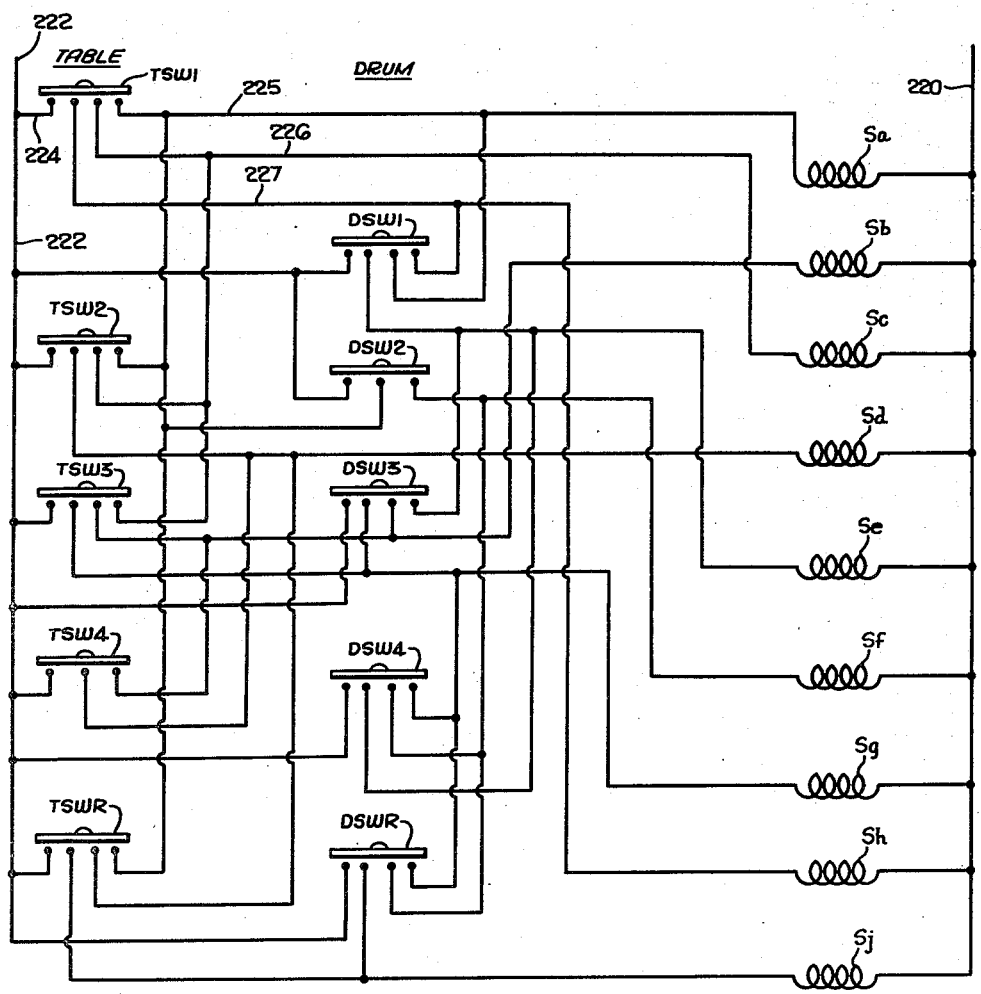

Figs. 3 and 4 are cross-sectional views taken substantially on the lines 3—3 and 4—4, respectively, of Fig. 1 and looking in the direction of the arrows, some parts being shown diagrammatically; and Fig. 5 is a schematic wiring diagram.

Referring now to the drawings, reference character 10 is applied to a diagrammatic representation of an internal combustion engine, depicted to typify a prime mover or other sources of mechanical power, since any suitable power source may be employed without departure from my invention. Internal combustion engines, arranged either singly or in banks of two or more are commonly employed in oil well drilling operations, for which my improved transmission apparatus is well suited. Engine 10 drives, through a hydraulic torque converter 12 of the Foettinger type and suitable chain and sprocket connecting means, generally designated 14, a jackshaft 15. Such parts will be recognized as conventional in the art. Jackshaft 15 is journaled in suitable bearings as 16 and carries at spaced points thereupon a pair of fluid-operable friction clutch assemblies, respectively designated A and B. The details of construction of such clutches are well known in the art and will require no exposition here. Engagement and disengagement of clutch A renders a driving sprocket 26 fast and loose with respect to jackshaft 15. Sprocket 26 drives a transmission input sprocket 30 through a chain 28. Engagement and disengagement of clutch B renders a driving sprocket 22 fast and lose with respect to jackshaft 15. Sprocket 22 drives a second transmission input sprocket 25 through a chain 24.

The transmission includes concentric driving and driven shafts carried by a case 33 having a supporting pedestal portion 34 by which it may be mounted upon any suitable fixed platform, in such position that the transmission shafts are substantially parallel to and spaced from the jackshaft 15. As best shown in Figs. 3 and 4, the case 33 is essentially cylindrical in form and supports in its left end wall (as the parts are viewed in Figs. 1 and 2) a tubular driving shaft 40 journaled in suitable antifriction bearings as 36, 38 and projecting both into and outwardly from the casing. Input sprocket 25 is fast upon tubular shaft 40 beside the end wall of the case. Tubular input shaft 44 is similarly journaled in the right end of the casing and projects therefrom to carry fast thereupon the input sprocket 30 previously mentioned.

Fast upon the inner end of input shaft 40 within the case is a sun gear 45. Fast upon input shaft 44 within the case but spaced axially from the sun gear is an internal toothed ring gear 46.

Figure 2:
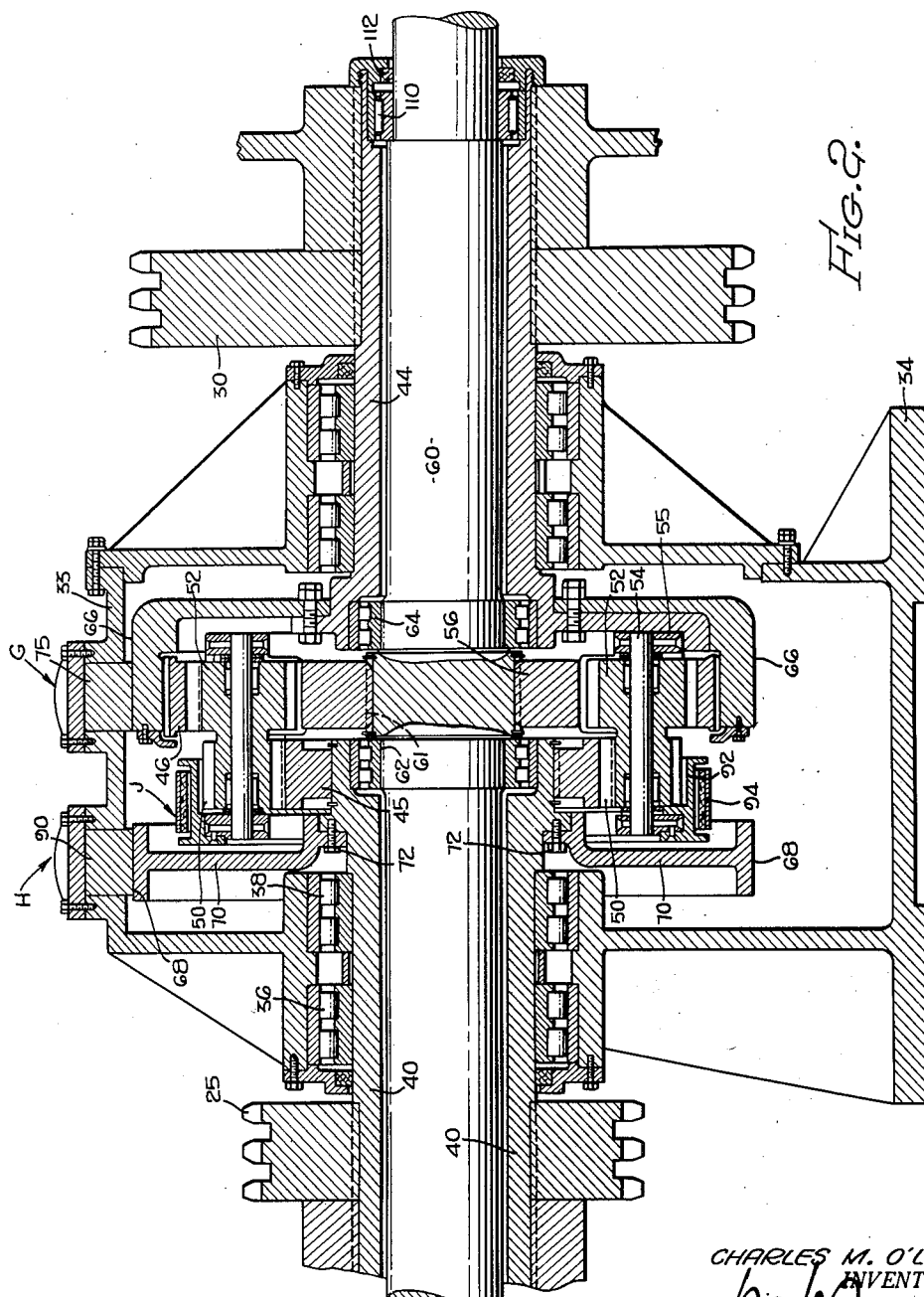
Fig. 2 is a diametric sectional view of the gear case on a larger scale, showing the principal gear elements and associated parts.

A plurality of double planetary gear assemblies coact with the sun gear 45 and internal toothed ring gear 46. As best shown in Fig. 2, each double planet gear assembly comprises a pair of coaxial, rigidly connected gears 50, 52, journaled on a suitable planetary stub axle as 54. The planetary stub axles form part of a cage or carrier structure generally designated 55. Planet gears 50 mesh with the sun gear 45 and are somewhat smaller than planet gears 52, which mesh with internal gear 46. A web 56 rigidly connected to and shown as formed integrally with the cage 55 extends radially inwardly between the spaced inner ends of the tubular shaft portions 40, 44, and is made fast to an axial driven shaft 60 which is freely journaled in the tubular shafts 40, 44, as by means of the antifriction bearings 62, 64. Driven shaft 60 extends outwardly through and from the outer ends of both of the tubular shafts 40, 44. A mid portion of axial shaft 60 is enlarged and splined as indicated at 61 to receive the conformably internally splined portion of carrier web 56.

A cylindrical outer peripheral braking surface 66 is formed integrally with the internal gear 46 and lies close to the peripheral wall of the casing 33. A similar braking surface 68 is provided, carried by a web 70 secured as by screw means 72 to the sun gear 45. Such cylindrical braking portions are adapted to coact with automatic one-way acting brake means, the construction of which may correspond substantially to the analogous parts of my Patent No. 2,555,454, previously mentioned. Each such brake includes a plurality of wedge blocks at 75, Fig. 3,
urged to a wedging position by a helical compression spring 76, but normally held out of wedging position by an opposed compression spring 82 which is strong enough to overcome spring 76. Three such blocks are shown but description of one will suffice. When the block 75 is free to move to the wedging position under the influence of the spring 76, it is effective to prevent reverse rotation of the drum and so of the gear connected thereto. The drum is normally reversible, however, because the wedge is held in an inoperative position by a retracting device comprising a finger as 78 attached to and movable by a piston 80 against which spring 82 acts to overcome the effect of spring 76. Spring 82 is housed in the cylinder 84 which contains the piston 80 and acts in a direction to move the finger 78 against the smaller end of the wedge-shaped block 75 and so drive the latter toward the larger end of its wedge-shaped enclosure 85 to free the block from braking engagement with the drum. As best shown in Fig. 3, the housing portion 85 and all parts of the one-way brake structure may be carried by an integral extension of the case 33. The one-way braking means for the internal gear 46 and the actuating means therefor are grouped under the general designation G. When fluid under pressure is admitted to the cylinders 84 through couplings as 86 at the outer ends thereof, the effort of their respective springs 82 is overcome and such springs are compressed as fingers 78 move away from wedges 75 to allow the latter to move to wedging position under the influence of the springs 76. Although in the structural arrangement shown in this application the brake blocks 75 are so arranged as to be normally held out of engagement by the springs 82, it will be recognized that if preferred the blocks could be of the type which is normally urged into engagement with the drum, and moved away from the drum by fluid pressure, rather than moved into engagement with the drum when fluid is supplied to their actuating means. In the construction shown in my Patent No. 2,555,454 previously referred to, the one-way brake blocks are normally allowed to drag, and are only disengaged during reverse operation. Such dragging has been eliminated in the present construction, in order to reduce the generation of heat, but it will be recognized that except for this factor, the operation is essentially the same. If the brake blocks were of the dragging type of my copending application in question, the blocks would drag during second and fourth speed operation, would engage automatically in first speed and in third speed, and would be positively released during reverse operation.

The one-way brake means for the sun gear 45 may consist of a plurality of wedge-shaped one-way brake blocks 90, the mounting and mode of actuation of which may correspond to those of the brake blocks 75 just described. Such one-way brake and the actuating means therefor is grouped under the general designation H. and is also arranged so that the blocks are rendered operative when fluid such as air under pressure is delivered to the actuating means. It will again be recognized that brake blocks of the dragging type, equipped with fluid-actuatable disengaging means, could be provided in lieu of the normally disengaged blocks, and that the operation would remain essentially the same, as previously pointed out.

The planet carrier 55 is also provided with a peripheral cylindrical braking surface portion 92 with which a friction brake band 94 is adapted to coact to immobilize the carrier at desired times. As best shown in Fig. 4, brake band 94 is adapted to be applied by means of a hydraulic piston and cylinder assembly, and this brake and its applying means are generally designated J. The applying means comprises a cylinder 95 carried by the housing 33 and containing a piston 96 to which a rod 98 is secured, the other end of the rod being attached to an end of the band 94. A spring 100 within the cylinder and acting against the piston 96 tends to release the band, which is applicable when fluid under pressure is introduced into the end of the cylinder opposite to that which contains the spring, the fluid being admissible through a suitable hydraulic coupling 102. The specific design and arrangement of the planetary gearing described above are claimed in my Patent No. 2,555,454.

The left-hand extremities of the interfitted shaft portions 40, 60 (as the parts are viewed in Fig. 1) project into a drivable clutch drum assembly generally designated 105, consisting of a hollow cylindrical casing assembly concentric with the shafts and which also constitutes the driven element of both of the two clutch structures housed therein. Hollow shaft 40 carries fast upon its extremity within the cylindrical casing 105 a cylindrical clutch driving drum element 106. Shaft 60 projects beyond the free end of hollow shaft 40 to carry a similar cylindrical clutch driving drum element 108 fast thereupon. Drum 106 supports an antifriction bearing assembly 110 for the outer end of shaft 60 and also a lubricant retainer 112. The clutching means contained in the drum 105 is similar to the clutching means disclosed in my aforementioned Patent No. 2,555,454, and consists of means for selectively clutching the driven drum 105 to either of the driving drums 106, 108, or for clutching all three such parts together, as may be desired.

A clutch band portion 115 is radially inwardly movable to engage the periphery of driving drum 106 when urged inwardly there against in response to the distention of a hollow annular flexible tube 116 of rubber or the like. The relaxed contour of tube 116 is substantially that of a radially flattened hollow torus, to the interior of which suitable fluid pressure may be applied as through a supply conduit 118. The clutch applying means consisting of tube 116 and associated parts is generally designated D. A similar peripheral clutch applying tube 120 is adapted to be distended radially inwardly by fluid delivered thereto through a conduit 122 to cause a clutching element 124 to clamp the periphery of driving drum 108 in analogous fashion. This clutch and its applying means consisting of tube 120 and associated parts is generally designated C. The bands 115 and 124 are held against rotating with respect to drum 105 by suitable keying means as 117.

Driven drum 105 is carried by a hub portion 125 journaled in fixedly mounted antifriction bearing means 126, 128. The conduits 118, 122 rotate with the drum 105 and could of course be formed as internal passages in the drum if preferred. Such conduits communicate with passages 123 and 127, respectively, which extend longitudinally through the hub 125. A manifold assembly 129 at the outer end of the hub 125 communicates with the passages 123, 127 to provide a continuous fluid conductive running connection between passage 123 and a fluid supply conduit 136, and also to provide a similar but isolated connection between passage 127 and another fluid supply conduit 138.

Fast upon the hub portion 125 is an output sprocket assembly 130 shown as connected by a driving chain 132 to a driven sprocket 134. Driven sprocket 134 is carried by a jackshaft 135 and fast with respect to a sprocket 180 from which a drive may be conducted by a chain 182, to a driven part such, for example, as the rotary table of a drilling rig.

At the right-hand end of the assembly, as the parts are viewed in Fig. 2, tubular shaft 44 and the axial shaft 60 project into a driven clutch housing drum 140. The right-hand driven drum 140 corresponds in construction and arrangement to the left-hand drum 105 previously described, and equivalent fluid-actuatable clutching means are provided for selectively making and breaking driving connections between the drum 140 and the shafts 44, 60. Tubular shaft 44 carries fast upon its end within the driven drum 140 a clutch-driving drum 142, while spindle 60 carries a similar clutch-driving drum 144. Brake bands 145, 146, respectively, are arranged to coact with the driving drum portions 142, 144, being selectively movable into operative engagement therewith by distensible tubes as 148, 150, the arrangement and mode of actuation of which may correspond to those of the tubes 116, 120 previously described. Actuating fluid is delivered to tube 148 through a conduit 152, while actuating fluid is delivered to the tube 150 through a similar conduit 154, these parts rotating with the drum 140 and being connected to internal fluid delivery passages 155, 156, respectively, in the hub portion 158 which carries the drum 140. A manifold 160 provides a running fluid-right connection between passage 155 and a fluid supply conduit 162 and between passage 156 and a fluid supply conduit 164. The right-hand clutch, actuating tube 150 and associated parts are grouped under the general designation E, while the other clutch with its actuating means consisting of tube 148 and associated parts is generally designated F.

An output sprocket 165 fast upon the hub portion 158 of the driven drum 140 is adapted to be connected as by the chain 166 to the driving sprocket 170 of the hoisting drum 172.

Driving sprocket 22 is preferably made twice the diameter of the driven sprocket 25, while driving sprocket 26 is half the diameter of driven sprocket 30. The speed ratio of jackshaft 15 with respect to the tubular input shaft 40 is therefore 1-to-2; while the speed ratio of the driving jackshaft 15 with respect to tubular input shaft 44 is 2-to-1. These values are chosen out of consideration for the operating characteristics of the Foettinger-type hydraulic torque converter, previously referred to. For similar reasons, the transmission gears are so selected that coacting with the sprocket means each speed change doubles or halves the speed ratio. It will be appreciated that in this manner the hydraulic torque converter can be kept operating within its range of highest efficiency. In the preferred embodiment depicted, for example, the diameter of the sun gear 45 is 20 inches, the diameter of the internal toothed ring gear 46 is 30 inches, the diameter of the smaller gear of each planetary cluster is 4 inches, and the diameter of the larger gear of each planetary cluster is 6 inches.

With the parts arranged in the manner described, input to output speed ratios of 4-to-1, 2-to-1, 1-to-1, and 1-to-2 are available in a forward direction. A low speed drive to the output sprocket 130 for the drilling table is effected by engaging clutches A and C and one-way brake means H. Internal gear 46 then rolls the planetary gears upon the sun gear 45, carrying the cage 56 forwardly at a reduced rate of speed. Shaft 60 is accordingly turned at the equivalent speed and the drive is transmitted to the drum 105 through the clutch members 108, 124. It will be seen that by selectively engaging and disengaging the clutch band 146 of clutch E, the same reduced speed drive may be taken from the opposite end of the transmission, for operating the hoisting drum 172. The second speed drive to the table drive output sprocket 130, at the 2-to-1 ratio, is also taken through the clutch A and sprockets 26, 30, and tubular shaft 44. Both clutches C and D are engaged with their respective drums 142, 144 and the planetary gearing is accordingly locked up so that both shafts and the drum 105 are driven at the same rate as the hollow spindle 44. The same drive is available at the other end of the transmission by engaging either or both of the clutches E, F, as will be apparent.

A third speed drive at the ratio of 1-to-1 is made available by disengaging clutch A and engaging clutches B and C and one-way brake G. Hollow input spindle 40 is thereby rotated at twice the speed of the driving jackshaft 15 and the planet gears are rolled on the internal toothed gear 46, reverse rotation of the ring gear being prevented by the one-way brake blocks 75. The planet carrier is thereby turned forwardly at half the speed of the input shaft and such drive can be taken from either end of the transmission by engaging either or both of the clutches C and E.

When the high speed drive is desired at the left end of the transmission, it is only necessary to engage clutches B, C and D to drive the drum 105 and sprocket 130 at the speed of the input shaft 40. When this higher speed drive is desired at the right end of the transmission, both of the clutches E and F are engaged concurrently with clutch B, so that the gearing is locked up and the spindles 44, 60 and output sprocket 165 are also driven at the same rate as the input spindle 40.

A reverse drive to the left or turntable sprocket 130 is effected by engaging the brake J to hold the carrier, while simultaneously engaging the clutch A. The planetary gear clusters are accordingly rotated upon their individual stub axles to impart a reverse drive at reduced speed to the sun gear 45. Spindle 40 is thereby turned backwards, and the drive to the sprocket 130 is completed by engaging the clutch D. It will be noted that under these circumstances tubular shaft 40 acts as the planetary output shaft.

A reverse drive to the right or drum output sprocket 165 is derived by engaging clutches B and F and brake J. The planetary gear clusters are accordingly turned upon their individual axes to rotate the internal gear 46, hollow spindle 44 and drum 140 backward. In this case tubular shaft 44 acts as the planetary output shaft. It will be appreciated that this reverse drive is at a higher speed ratio than the reverse drive previously mentioned for the other output sprocket 130, but that if it is desired to provide two reverse speeds at both ends of the transmission, this may of course be done by suitable supplemental shafting, or the reverse speed ratios may be changed by reversing the arrangement of the driving sprockets 22, 25 and 26, 30.

All of the four forward speeds previously described are inherently capable of providing positive simultaneous drives to both of the two output sprockets 130, 165. It is also possible to drive the two output sprockets simultaneously but differentially, in such manner as to equalize the torque delivered to the two output sprockets. This is of great advantage under some conditions, as for example if the two output sprockets are employed to drive compounded slush pumps. In compound slush pump operation, it frequently happens that due to an obstruction the power demand of one pump increases greatly with respect to the other. With positive drive, the obstructed pump may absorb the entire torque output and damage may result, although if under such conditions the drive could be transferred primarily to the unobstructed pump, and the latter speeded up, it would help to clear the obstructed pump. With my improved transmission used as a differential drive under such conditions, the more heavily loaded pump will slow down, and the unobstructed pump will speed up proportionately until the loads are again equalized. This greatly reduces the danger of overstressing any of the parts of either pump.

One such differential drive is derivable by simultaneously engaging clutches A, E and D. This constitutes a low speed differential drive, due to the relative sizes of the sprockets 26 and 30. This drive applies torque in a forward direction to the sprocket 165 because the carrier 55, to which sprocket 165 is connected through clutch E, is urged forwardly as the planetary gears are rolled forwardly over the sun gear 45. The reaction of the planetary gears upon the sun gear applies reverse torque to the sun gear and through shaft 40, and clutch D transmits such reverse torque to the other sprocket 130. Torque is accordingly applied to the sprockets 130, 165 in opposite directions, but where the sprockets are employed to drive pumps, the direction of rotation is immaterial since it may be compensated for by the manner of connecting pumps, as will be understood.

A higher speed differential drive is derivable in a similar manner by simultaneously engaging the clutches B, C and F. Forward torque is now applied to the carrier 55, and through shaft 60 and clutch C to the sprocket 130, while reverse torque is applied through the planetary gears and internal toothed gear 46, shaft 44 and clutch F to the sprocket 165.

In Fig. 5, I have schematically indicated a suitable wiring arrangement adapted to provide manually controllable push button operation for changing the speed ratios of the transmission. Referring to Fig. 4, it may be assumed that each of the fluid-operable actuating means for the several clutches and braking devices includes a solenoid-operable three-way valve corresponding to the one shown in that view and comprising a body portion 260 to which fluid under pressure, which may comprise air, may be delivered through a conduit as 202. The details of such valves are well known in the art and need not be considered herein. The valve is movable under the control of a solenoid Sh to either of two positions, in one of which it establishes communication between the supply conduit 202 and a conduit 206, while in the other position the conduit 202 is cut off and conduit 206 is placed in communication with a vent 208. The conduit 206 is connected to the fluid actuating means for the several one-way braking devices, designated H, for the sun gear 45.

Fig. 4 also shows a conduit 210 extending to the cylinder 95 for the reverse reaction brake actuator J, and it will be understood that a similar solenoid-operated valve is incorporated between the source of fluid supply pressure and the conduit 210, and that one such solenoid-operated valve is provided for each of the other brake clutch actuating mechanisms, as previously indicated. The solenoids for all such valves are diagrammatically shown in Fig. 5, where the several solenoids are designated Sa, Sb, Sc, Sd, Se, Sf, Sg, Sh and Sj. The second letter of each such designation corresponds to the previously indicated alphabetical designations applied to the several brakes and clutches. Each such solenoid has one lead line connected to a power supply conductor 220. In the arrangement shown in Fig. 5, one electrical switching device is provided for each forward speed for each end of the transmission, and one switching device for each reverse speed, although this arrangement is of course given by way of example and subject to variation. Button-type contactors are shown in the drawing, but it will be recognized that this is also a matter of choice. Preferably also a conventional interlock system is provided to prevent the closing of more than one switch at a time, or to prevent the simultaneous closing of switches corresponding to two different speeds at the same time.

Each of the several buttons is arranged to complete an electrical connection between the power lines 220, 222 and such solenoids as require actuation in order to establish one speed ratio. The switch buttons for the left or table driving end of the transmission are arranged one under the other and successively designated TSw1, TSw2, TSw3, TSw4 and TSwR. The switch buttons for the right or drum end are similarly designated DSw1, DSw2, DSw3, DSw4 and DSwR. It is believed that a detailed tracing of the wires connected to the several switches will not be required. It will be noted that TSw1, when closed, completes a connection from conductor 224 to the conductors 225, 226 and 227, which lead respectively to the solenoids Sa, Sc and Sh. These solenoids cause engagement of clutches A and C and one-way brake H, respectively, and as previously pointed out, the simultaneous engagement of clutches A and C and one-way brake H is effective to impart a low speed drive to sprocket 130. Similarly, the closing of TSw2 completes a connection from power supply conductor 222 to the solenoids Sa, Sc and Sd for clutches A, C and D, comprising the second speed table drive group; the closing of TSw3 completes a connection to solenoids Sb, Sc and Sg for clutches B and C and one-way brake G, constituting the third speed table drive group; the closing of TSw4 completes a connection to solenoids Sb and Sd for clutches B and D, comprising the fourth speed table drive group; and the closing of TSwR completes a connection to solenoids Sa, Sd and Sj for clutches A and D and reaction brake J, for low speed reverse operation of table drive sprocket 130.

The closing of DSw1 completes a connection to the solenoids Sa, Se and Sh to engage clutches A and E and one-way brake H for first speed operation of the drum or right-hand output sprocket 165. The closing of DSw2 completes a power connection to the solenoids Sa and Sf to engage clutches A and F of the second speed drum drive group; the closing of DSw3 completes a connection to the solenoids Sb, Sc and Sg for clutches B and E and one-way brake G, comprising the third speed drum drive group; the closing of DSw4 completes a connection to the solenoids Sb, Se and Sf for clutches B, E and F, comprising the fourth speed drum drive group; and the closing of DSwR completes a connection to the solenoids Sb, Sf and Sj for clutches B and F and reaction brake J, comprising the higher speed reverse drive group for drum sprocket 165. As shown, these switches are arranged so that when each switch is open, it breaks all connections through that switch to the several solenoids. It will be understood that any other suitable wiring or control arrangement may be employed, and that if preferred, automatic actuation could be provided, as for example, in the manner disclosed in the copending application of John A. Blair, Serial No. 670,821, filed May 18, 1946, now Patent No. 2,529,129. Such automatic operation, in accordance with the disclosure of the Blair application referred to, could readily be effected by arranging for each of the forward speed switches TSw1, TSw2, TSw3 and TSw4 and DSw1, DSw2, DSw3 and DSw4 to be actuable to the closed position by a solenoid analogous to the solenoids 7, 8 and 9 shown in Fig. 5 of such Blair application, but it will be understood that, with the present transmission system wherein only one switch is to be closed at a time, the energization of the switch actuating solenoids would never be simultaneous as in the arrangement of Fig. 5 of the Blair application. The energization of the switch actuating solenoids would be modified so that only one such solenoid would be energized at a time in accordance with the modified arrangement described on page 23 of the Blair application, lines 1-15, inclusive.

Another typical alternative wiring arrangement would be one employing switches adapted to simultaneously energize the valve actuating solenoids Sa, Sd and Se for a low speed differential drive to both ends of the transmission simultaneously and/or to simultaneously energize the solenoids Sb, Sc and Sf for a higher speed differential drive, as also previously explained.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims. Transmission mechanisms incorporating certain of the broad features of that described herein are disclosed and claimed in applicant's copending applications, Serial No. 647,677, filed February 15, 1946, now Patent No. 2,589,119; Serial No. 676,450, filed June 13, 1946, now Patent No. 2,589,121; and Serial No. 746,664, filed May 8, 1947, now Patent No. 2,588,408.

What is claimed is:

1. A planetary transmission construction comprising a pair of longitudinally spaced but axially aligned tubular input shafts, a planetary gearset including a pair of coaxial gears one drivable by each of said input shafts, planetary gear means interconnecting said coaxial gears, a carrier rotatably supporting said planetary gear means, an axial output spindle extending through said tubular input shafts and projecting at both ends from said tubular shafts and connected to said carrier separate selectively operable means for driving said tubular input shafts at different speeds ratios from a common power source and separate selectively operable means for preventing rotation of each of said coaxial gears, and power take-offs operatively associated with the projecting ends of said output spindle respectively.

2. A planetary transmission construction comprising a pair of longitudinally spaced but axially aligned tubular input shafts, a planetary gearset including a pair of coaxial gears one drivable by each of said input shafts, planetary gear means interconnecting said coaxial gears, a carrier rotatably supporting said planetary gear means, an axial output spindle extending through said tubular input shafts and connected to said carrier, means for driving said tubular input shafts at different speed ratios, separate selectively operable means for preventing rotation of each of said coaxial gears, a fixed housing enclosing the abutting ends of said tubular input shafts and also enclosing said gears and carrier, said housing also rotatably supporting said shafts and said output spindle and gears, said spindle projecting at each end beyond the tubular shafts, the two tubular shafts and the two ends of the output spindle projecting laterally from opposite ends of said fixed housing, a driven clutch drum at each end of the transmission, each such drum enclosing one end of the spindle and the projecting end of one of said tubular shafts, and clutch means within each drum for selectively completing an output connection to either the spindle or shaft or to both the spindle and shaft simultaneously.

3. A power transmission system including a planetary transmission having three interconnected gear elements, two tubular shafts in substantially coaxial relation, each tubular shaft being connected to one of said elements, and an axial shaft rotatable in said tubular shafts and connected to the other of said elements, said tubular shafts being arranged end-to-end and said axial shaft extends through both tubular shafts, a central casing enclosing the inner abutting ends of said tubular shafts and rotatably supporting the same, said casing also enclosing said gear elements, two toothed driving members of different sizes each carried by one of said tubular shafts and one arranged on each side of said casing, said casing being fixed against rotation, reaction means carried by the casing for preventing unwanted rotation of certain of said gear elements, a pair of power output shafts axially aligned with said axial shaft at opposite ends of the latter, and a clutch means associated with each output shaft for selectively clutching the same to said axial shaft or the adjacent tubular shaft or both said last mentioned shafts.

4. A power transmission system including a planetary transmission having three interconnected gear elements, two tubular shafts in substantially coaxial relation, each tubular shaft being connected to one of said elements, and an axial shaft rotatable in said tubular shafts and connected to the other of said elements, said tubular shafts being arranged end-to-end and said axial shaft extending through both tubular shafts, a driving shaft, means for selectively driving said tubular shafts at different speed ratios from said driving shaft, reaction means for preventing unwanted rotation of certain of said gear elements, a pair of power output shafts axially aligned with said axial shaft at opposite ends of the latter, and a clutch means associated with each output shaft for selectively clutching the same to said axial shaft or the adjacent tubular shaft or both said last mentioned shafts.

5. In combination, a hoisting drum and rotary table drive shaft assembly having coaxial toothed driving elements at opposite ends of the drum, one of said elements being connected to the drum and the other being connected to the rotary table drive shaft, a pair of spaced coaxial shafts extending parallel to the axis of the drum and having toothed driving elements operatively connected respectively to said driving elements, an intermediate shaft coaxial with and between said spaced shafts, a pair of axially spaced tubular shafts surrounding said intermediate shaft, clutch means associated with each of said first-mentioned spaced shafts for selectively clutching the same to the intermediate shaft or the adjacent tubular shaft or to both of said last-mentioned shafts, a planetary transmission having three interconnected gear elements connected respectively to said intermediate shaft and said tubular shafts, means for preventing unwanted rotation of said tubular shafts, a power supply shaft, and means for selectively driving said tubular shafts from said power supply shaft at different speed ratios.

6. In combination, a hoisting drum and rotary table drive shaft assembly having coaxial toothed driving elements at opposite ends of the drum, one of said elements being connected to the drum and the other being connected to the rotary table drive shaft, a pair of spaced coaxial shafts extending parallel to the axis of the drum and having toothed driving elements operatively connected respectively to said driving elements, an intermediate shaft coaxial with and between said spaced shafts, a pair of axially spaced tubular shafts surrounding said intermediate shaft, clutch means associated with each of said first-mentioned spaced shafts for selectively clutching the same to the intermediate shaft or the adjacent tubular shaft or to both of said last-mentioned shafts, a planetary transmission having three interconnected gear elements connected respectively to said intermediate shaft and said tubular shafts, means for preventing unwanted rotation of said tubular shafts, means for holding said intermediate shaft against rotation, a power supply shaft and means for selectively driving said tubular shafts from said power supply shaft at different speed ratios.

7. A power transmission system, including a planetary transmission having three interconnected gear elements, a pair of shafts having a common axial line connected respectively to two of said elements, a third shaft having the same axial line as said pair of shafts and connected to the other of said elements, selectively operable means for driving either of said pair of shafts at different speed ratios from a common power source, means operable to prevent relative movement between the elements of said planetary transmission, and separate selectively operable means for holding either of said pair of shafts stationary.

8. A power transmission system, including a planetary transmission having three interconnected gear elements, a pair of shafts having a common axial line connected respectively to two of said elements, a third shaft having the same axial line as said pair of shafts and connected to the other of said elements, selectively operable means for driving either of said pair of shafts at different speed ratios from a common power source, separate selectively operable means for holding either of said pair of shafts stationary, and clutch means for selectively completing an output connection to either said third shaft or one of said pair of shafts or to both said third shaft and one of said pair of shafts simultaneously.

9. A power transmission system, including a planetary transmission having three interconnected gear elements, a pair of shafts having a common axial line connected respectively to two of said elements, one of said pair of shafts being tubular, a spindle extending through said tubular shaft and connected to the other of said elements, selectively operable means for driving either of said pair of shafts at different speed ratios from a common power source, separate selectively operable means for holding either of said pair of shafts stationary, a power take-off shaft, and clutch means associated with said power take-off shaft for selectively clutching said power take-off shaft to said spindle or said tubular shaft or both said spindle and said tubular shaft simultaneously.

References Cited in the file of this patent

UNITED STATES PATENTS

| Number | Name | Date |
|---|---|---|
| 615,360 | Millot | Dec. 6, 1898 |
| 744,178 | Dresser | Nov. 17, 1903 |
| 1,256,372 | Rowledge | Feb. 12, 1918 |
| 2,214,164 | Fawick | Sept. 10, 1940 |
| 2,304,030 | Schmitter | Dec. 1, 1942 |
| 2,334,074 | Coy | Nov. 9, 1943 |
| 2,366,646 | Orr | Jan. 2, 1945 |
| 2,402,164 | Kelbel | June 18, 1946 |
| 2,546,378 | Winthers | May 27, 1951 |
| 2,555,454 | O'Leary | June 5, 1951 |
| 2,594,064 | O'Leary | Apr. 22, 1952 |